United States Patent [19]

Mizutani et al.

[11] Patent Number: 5,356,841
[45] Date of Patent: Oct. 18, 1994

[54] GLASS-CERAMIC COMPOSITE

[75] Inventors: Hidetoshi Mizutani; Kazunori Miura; Kazuo Kondo, all of Nagoya, Japan

[73] Assignee: NGK Spark Plug Co., Ltd., Aichi, Japan

[21] Appl. No.: 841,030

[22] Filed: Feb. 25, 1992

[30] Foreign Application Priority Data

Feb. 27, 1991 [JP] Japan .................... 3-033216

[51] Int. Cl.$^5$ .............................. C03C 14/00
[52] U.S. Cl. .......................... 501/32; 501/9; 501/67; 501/70
[58] Field of Search ........... 501/9, 17, 32, 67, 70, 501/71

[56] References Cited

U.S. PATENT DOCUMENTS

| | | | |
|---|---|---|---|
| 4,624,934 | 11/1986 | Kokubu et al. | 501/17 |
| 4,655,864 | 4/1987 | Rellick | 501/17 X |
| 4,755,490 | 7/1988 | DiLazzero | 501/32 X |
| 4,855,259 | 8/1989 | Claussen et al. | 501/9 |
| 4,997,795 | 3/1991 | Hang et al. | 501/9 X |
| 5,045,402 | 9/1991 | Adams, Jr. et al. | 501/9 X |

FOREIGN PATENT DOCUMENTS

| | | | |
|---|---|---|---|
| 0083957 | 5/1984 | Japan | 501/32 |
| 62-113758 | 5/1987 | Japan . | |
| 63-6503 | 2/1988 | Japan . | |
| 63-31420 | 6/1988 | Japan . | |
| 2-149464 | 6/1990 | Japan . | |
| 2-225338 | 9/1990 | Japan . | |

*Primary Examiner*—Karl Group
*Attorney, Agent, or Firm*—Sughrue, Mion, Zinn, Macpeak & Seas

[57] ABSTRACT

The invention provides a glass-ceramic composite with sufficient strength and other excellent properties suitable for IC packages or multilayer substrates. The glass-ceramic composite of the invention includes crystallized glass and at least either of alumina and mullite at the ratio by weight of eighty through fifty-five to twenty through forty-five. The crystallized glass includes cordierite as primary crystals and contains 40 to 52 percent by weight of silicon dioxide or $SiO_2$, 27 to 37 percent by weight of aluminum oxide or $Al_2O_3$, 11 to 13 percent by weight of magnesium oxide or $MgO$, 2 to 8 percent by weight of diboron trioxides or $B_2O_3$, 2 to 8 percent by weight of calcium oxide or $CaO$, and 0.1 to 3 percent by weight of zirconium oxide or $ZrO_2$.

17 Claims, No Drawings

GLASS-CERAMIC COMPOSITE

BACKGROUND OF THE INVENTION

The present invention relates to a glass-ceramic composite with excellent properties used as electric-insulating ceramic material for high frequency insulators, IC packages, and multilayer substrates, etc.

Alumina with large insulating capacity is generally used as electric-insulating material for substrates of electronic parts and segments. Alumina substrates, however, fail to attain sufficient properties while high-speed and greater scale semi-conductor chips are developed. Alumina substrates have relatively large permittivity and a greater thermal expansion coefficient than semi-conductor chips, thus causing delay in signal propagation and stress applied onto semi-conducting chips.

Although low resistance conductors such as gold, silver, and copper are preferable for substrates of semi-conductor chips, these conductor metals with low melting points have not actually been used since only metals with high melting points are applicable to alumina substrates fired at high temperatures.

Low temperature-fired substrates have recently been developed in order to solve the above problem; such substrates are broadly classified into two groups, that is, glass composite and crystallized glass.

Examples of the glass composite include: alumina with given amounts of alkaline earth metals and other additives (Japanese Published Unexamined Patent Application No. H2-149464); alumina with glass powder having a predetermined specific surface area (Japanese Published Unexamined Patent Application No. S62-113758); and glass composition including hard powder forming a specified crystal phase (Japanese Published Unexamined Patent Application No. H2-225338).

The crystallized glass is: for example, a crystallized glass body with low permittivity and a small thermal expansion coefficient (Japanese Published Examined Patent Application No. S63-31420); or crystallized glass with ceramic particles dispersed therein and covered with silicon dioxide (Japanese Published Examined Patent Application No. S63-6503).

Neither the glass composite nor the crystallized glass mentioned above are, however, not perfect nor sufficient as substrate material. The glass composites have insufficient strength, lack of dimensional precision, and large dielectric loss, and the crystallized glass bodies have the following problems.

The crystallized glass body with low permittivity and a small thermal expansion coefficient has strength as low as 2,000 kg/cm$^2$ and a very small thermal expansion coefficient of 16 to 26 × 10$^{-7}$, thus being not applicable to IC packages, which require joints of terminals or other metal parts and hermetic seals. When the substrate has insufficient strength and a very small thermal expansion coefficient, junction with brazing or glass may cause cracks on the substrate.

On the other hand, simple substance of the crystallized glass requires long-time firing for sufficient strength, thus consuming labor, time, and money. Moreover, the material for it is quite expensive.

SUMMARY OF THE INVENTION

One objective of the invention is accordingly to provide a glass-ceramic composite with sufficient strength and other excellent properties.

Another objective of the invention is to provide a glass-ceramic composite easily manufactured at relatively low cost.

The above and other related objectives are realized by a glass-ceramic composite including crystallized glass and at least either of alumina and mullite at the ratio by weight of eighty through fifty-five to twenty through forty-five. The crystallized glass includes cordierite as primary crystals and contains 40 to 52 percent by weight of silicon dioxide or SiO$_2$, 27 to 37 percent by weight of aluminum oxide or Al$_2$O$_3$, 11 to 13 percent by weight of magnesium oxide or MgO, 2 to 8 percent by weight of diboron trioxide or B$_2$O$_3$, 2 to 8 percent by weight of calcium oxide or CaO, and 0.1 to 3 percent by weight of zirconium oxide or ZrO$_2$.

Ceramic powder, that is, alumina and/or mullite, with sufficient strength and a high thermal expansion coefficient is mixed with and dispersed in the crystallized glass so as to enhance the toughness and strength of the glass, thereby improving the thermal expansion coefficient of the composite.

A primary factor for improving the strength in such composite materials is interfacial bonding between matrices and dispersed particles. The crystallized glass used in the invention includes cordierite as primary crystals and a remaining glass layer of favorably dense structure and has strong interfacial bonding. Hence, addition of a smaller amount of alumina than that of prior-art glass-ceramic substrates is sufficient for giving the composite substrate the strength as large as alumina substrates.

In the composite of the invention, ceramic powder with sufficient strength and a high thermal expansion coefficient is uniformly dispersed in the crystallized glass matrices with low permittivity and a low thermal expansion coefficient. The dispersed particles restrain the size of the Griffith cracks and necessitate higher energy for development and propagation of the cracks.

Because the dispersed particles have a greater thermal expansion coefficient than the matrices, the tensile stress is radially applied on the interface between the dispersed particles and the matrices during cooling. Then the compression stress is applied onto the tangent of the matrices to improve the strength.

The glass-ceramic composite of the invention has greater strength and a higher thermal expansion coefficient than the simple substance of crystallized glass. Substrates of the composite material have sufficient strength for joint of metal parts and lower permittivity than conventional alumina substrates.

While conventional glass-ceramic composites contain 50 to 60 percent by weight of ceramic powder to enhance the strength, the composite of the invention improves its strength by the specific glass composition, which is in such a range that the crystal phase primarily precipitates and increases viscosity at glass softening temperatures. When added ceramic powder exceeds 45 percent by weight, its large viscosity prevents ceramic particles from being sufficiently covered with glass and thus allows water absorption. The composite of the invention, on the other hand, has a greater portion of the crystal phase and a smaller amount of ceramic powder, thus attaining sufficient strength without causing water absorption.

Another feature of the invention is a glass-ceramic composite including glass and at least either of alumina and mullite at the ratio by weight of eighty through fifty-five to twenty through forty-five. The glass contains 40 to 52 percent by weight of silicon dioxide or $SiO_2$, 27 to 37 percent by weight of aluminum oxide or $Al_2O_3$, 11 to 13 percent by weight of magnesium oxide or MgO, 2 to 8 percent by weight of diboron trioxide or $B_2O_3$, 2 to 8 percent by weight of calcium oxide or CaO, and 0.1 to 3 percent by weight of zirconium oxide or $ZrO_2$.

Non-crystallized or noncrystalline glass may be manufactured according to various manufacturing conditions like heating speed. In such a case, the glass-ceramic composite of the above composition has the dense glass structure and enhanced bending strength.

In either of the glass-ceramic composites above, when the amount of alumina or mullite is less than 20 percent by weight, the strength is not sufficiently improved while the permittivity and the thermal expansion coefficient are enhanced, compared with the simple substance of crystallized glass. On the other hand, when the amount is greater than 45 percent by weight, the composite has expanded inner pores and allows water absorption; that is, the resultant composite is not suitable for substrates.

DETAILED EXPLANATION OF THE PREFERRED EMBODIMENTS

Examples of the glass-ceramic composite according to the invention are hereinafter described with the results of performance tests.

Since there may be many modifications and changes without departing from the scope of the invention, the examples below are not intended to limit the invention to the examples but are intended to illustrate the invention more clearly.

Powder materials $CaCO_3$ (calcium carbonate), Al(OH)$_3$ (aluminum hydroxide), $SiO_2$ (silicon dioxide), $MgCO_3$ (magnesium carbonate), $H_3BO$ (boric acid), and $ZrO_2$ (zirconium oxide) were weighed and mixed according to glass compositions No. 1 through No. 5 shown in Table 1. The mixture was melted in a platinum crucible (Pt: 90%; Rh: 10%) at temperatures of 1,400° C. to 1,500° C. Alternatively, an alumina crucible may be used. The molten mixture was dropped into water to form frit, which was crushed with an alumina ball mill, to glass powder with not greater than 3 micrometer of the average grain diameter and not less than 4 m$^2$/g of the specific surface area. Glass compositions No. 6 and No. 7 of reference samples (described later) are also shown in Table 1.

TABLE 1

| Composition No. | Glass Composition (% by weight) | | | | | |
|---|---|---|---|---|---|---|
| | CaO | $Al_2O_3$ | $SiO_2$ | MgO | $B_2O_3$ | $ZrO_2$ |
| Examples | | | | | | |
| 1 | 6 | 35 | 41 | 11 | 6 | 2 |
| 2 | 7 | 36 | 42 | 11 | 3 | 1 |
| 3 | 4 | 31 | 43.5 | 11.5 | 8 | 2 |
| 4 | 4.5 | 32 | 45 | 12 | 4.5 | 2 |
| 5 | 8 | 28 | 43 | 12 | 8 | 1 |
| References | | | | | | |
| 6 | 1 | 35 | 45 | 12 | 5 | 2 |
| 7 | 3 | 38 | 43 | 11 | 4 | 1 |

The glass powder thus prepared and commercially available alumina or mullite powder (purity: 99.9%) were mixed according to the various ratios of percents by weight (wt %) given in Table 2, and were molded by the conventional green sheet method or with pressure. The molded body was heated at the heating speed of 180° C./hour and fired at 900° C. to 1,000° C. to give glass-ceramic composites No. 1 through No. 10.

Various properties of the glass-ceramic composites thus obtained were measured in the following manner: existence of cordierite crystals by X-ray diffraction; coefficient of water absorption, specific permittivity, and thermal expansion coefficient in compliance with JIS C2141; and bending strength in compliance with JIS R1601. Cordierite was proved to exist in the glass-ceramic composites as primary crystals. The measured properties of the composites are shown in Table 2.

TABLE 2

| Fired Composite No. | Composition No. | Glass wt % | Alumina wt % | Mullite wt % | Water Absorption % | Specific Permittivity × 10 MHz | Thermal Expansion Coefficient × $10^{-7}$ | Bending strength Kg/cm$^2$ |
|---|---|---|---|---|---|---|---|---|
| 1 | 1 | 80 | 20 | 0 | 0 | 5.6 | 35 | 2220 |
| 2 | 1 | 80 | 10 | 10 | 0 | 5.5 | 34 | 2140 |
| 3 | 2 | 70 | 30 | 0 | 0 | 6.2 | 45 | 2700 |
| 4 | 2 | 70 | 20 | 10 | 0 | 6.0 | 43 | 2580 |
| 5 | 3 | 60 | 40 | 0 | 0 | 6.4 | 52 | 3120 |
| 6 | 3 | 60 | 20 | 20 | 0 | 6.2 | 49 | 2960 |
| 7 | 4 | 80 | 20 | 0 | 0 | 5.8 | 33 | 2330 |
| 8 | 4 | 80 | 10 | 10 | 0 | 5.7 | 31 | 2270 |
| 9 | 5 | 60 | 40 | 0 | 0 | 6.4 | 54 | 3300 |
| 10 | 5 | 60 | 30 | 10 | 0 | 6.1 | 52 | 2900 |

As clearly seen in Table 2, the glass-ceramic composites of the invention have dense structure, high precision in dimensions, and zero water absorptivity. The thermal expansion coefficient and the bending strength are enhanced with increase in ceramic powder content. The glass-ceramic composites of the invention have remarkably smaller specific permittivity than conventional alumina substrates, greater thermal expansion coefficient than prior-art crystallized glass bodies, and large bending strength of approximately 3,000 kg/cm$^2$.

REFERENCES

The glass compositions Nos. 1 and 3 of the examples and those Nos. 6 and 7 of references were mixed with ceramics at various ratios given in Table 3, and glass-ceramic composites No. 11 through No. 19 were prepared. Properties of the reference composites were also measured and are shown in Table 3.

The composite No. 11 is a simple substance of crystallized glass; the composite No. 12 uses alumina powder (purity 99.9%); the composites Nos. 13 through 16 have the glass compositions in the range of the examples but the mixing ratios of glass to ceramics out of the range; and the composites Nos. 17 through 20 have the mixing ratios of glass to ceramics in the range of the examples but the glass compositions out of the range. The composite No. 12 was fired at 1,600° C. while the other composites No. 11 and Nos. 13 through 20 were heated and fired at 180° C./hour.

S63-31420, the glass-ceramic composites of the examples have remarkably improved thermal expansion coefficient and bending strength, thus allowing sufficient and favorable joints with metal parts and hermetic seals.

The glass-ceramic composites of the examples have dense structure and the bending strength as high as 3,000 kg/cm$^2$ owing to the addition of at least one of

TABLE 3

| Fired Composite No. | Composition No. | Glass wt % | Alumina wt % | Mullite wt % | Water Absorption % | Specific Permittivity × 10 MHz | Thermal Expansion Coefficient × 10$^{-7}$ | Bending strength Kg/cm$^2$ |
|---|---|---|---|---|---|---|---|---|
| 11 | 1 | 100 | 0 | 0 | 0 | 5.3 | 26 | 1700 |
| 12 | — | 0.3 | 99.7 | — | 0 | 10.0 | 81 | 3000 |
| 13 | 1 | 90 | 10 | 0 | 0 | 5.4 | 25 | 1860 |
| 14 | 1 | 90 | 5 | 5 | 0 | 5.3 | 28 | 1790 |
| 15 | 3 | 40 | 60 | 0 | 5.4 | 6.8 | 62 | 1340 |
| 16 | 3 | 40 | 30 | 30 | 7.6 | 6.2 | 58 | 1230 |
| 17 | 6 | 70 | 30 | 0 | 13.3 | 5.7 | 39 | 870 |
| 18 | 6 | 70 | 30 | 10 | 14.2 | 5.9 | 37 | 830 |
| 19 | 7 | 60 | 40 | 0 | 15.5 | 5.5 | 48 | 650 |
| 20 | 7 | 60 | 20 | 20 | 16.0 | 5.4 | 46 | 690 |

As clearly seen in Table 3, those containing less than 20 percent by weight of ceramic powder (alumina+mullite), that is, the composites No. 13 and No. 14, have substantially the same strength as that of the simple substance of crystallized glass, that is, the composite No. 11. On the other hand, those containing greater than 45 percent by weight of ceramic powder (the composites No. 15 and No. 16) are not sufficiently dense and have undesirable water absorptivity and the poorer bending strength (not greater than 2,000 kg/cm$^2$) than the simple substance of crystallized glass.

Those with the glass compositions out of the range of the embodiment, that is, the composites Nos. 17 through 20, do not have sufficiently dense structure and cannot be favorably used.

TEST

Substrates composed of the fired composites Nos. 1 through 10 of the examples and that consisting of a simple substance of crystallized glass (as a reference) were prepared. A kovar ring was fixed to each of the substrates with Ag—In—Cu brazing material at the temperature of 600° C. to 700° C. Joints of the ring and the substrates were observed.

The reference substrate of the simple substance of crystallized glass had cracks due to difference in the thermal expansion coefficient and to poor strength, whereas those of the glass-ceramic composites of the examples did not have any cracks but were joined favorably.

The glass-ceramic composites of the examples within the ranges of glass composition and of mixing ratio of glass to ceramics have dense structure, no water absorbing capacity, low permittivity, high thermal expansion coefficient, and high bending strength and are preferably applicable to IC packages.

Compared with the crystallized glass disclosed in Japanese Published Examined Patent Application No.

alumina and mullite, compared with glass-ceramic sintered body disclosed in Japanese Published Unexamined Patent Application No. H2-225338. Furthermore, the smaller amount of zirconia in the composites of the examples prevents adverse effects of alpha-ray, and the composites are thus preferable for substrates.

Since the glass-ceramic composites of the examples include crystallized glass with higher crystallinity than the crystallized glass disclosed in Japanese Published Unexamined Patent Application No. S62-113758, a smaller amount of alumina is sufficient for enhanced strength. The small amount of alumina allows preferable wetting on the interface between glass and alumina, reducing the inner voids. The composites give preferable surface roughness to multilayer substrates and allow wiring of fine pitches.

OTHER EXAMPLES

Other examples of the invention are described briefly. The composites of the same glass composition and mixing ratio as the above examples were heated and fired at a much higher speed, for example, 1,800° C./hour, than that of the above examples. Properties of the glass-ceramic composites were measured and are shown in Table 4.

TABLE 4

| Fired Composite No. | Composition No. | Glass wt % | Alumina wt % | Mullite wt % | Water Absorption % | Specific Permittivity × 10 MHz | Thermal Expansion Coefficient × 10$^{-7}$ | Bending strength Kg/cm$^2$ |
|---|---|---|---|---|---|---|---|---|
| 21 | 5 | 60 | 40 | 0 | 0 | 7.4 | 60 | 3180 |
| 22 | 0 | 60 | 30 | 10 | 0 | 7.0 | 57 | 2830 |

The composites Nos. 21 and 22 remained as noncrystalline glass due to the higher heating speed, and have greater specific permittivity and thermal expansion coefficient than Nos. 9 and 10 but have virtually the same bending strength due to the dense structure of the glass.

When firing of the composite is implemented simultaneously with, for example, silver metallization, the high heating speed prevents diffusion of metallization into the substrate.

As described above, the glass-ceramic composite of the invention includes ceramics and crystallized glass, which includes cordierite as primary crystals and has a predetermined glass composition, at a given ratio by weight. The composite has sufficient strength, high thermal expansion coefficient, and low permittivity and allows favorable joints with metal parts and hermetic seals, thus being suitable for IC packages, etc. Because of the dense surface and no water absorbing capacity, the composite is also applicable to multilayer substrates and allows wiring of fine pitches.

The glass-ceramic composite including glass of a predetermined composition and ceramics at a given ratio by weight is prepared by applying the relatively high heating speed. When firing of the composite is performed simultaneously with metallization, the high heating speed prevents diffusion of metallization into the substrate.

What is claimed is:

1. A glass-ceramic composite consisting essentially of non-crystallized glass and a ceramic containing at least one of alumina and mullite at the ratio by weight of eighty through fifty-five to twenty through forty-five, said non-crystallized glass containing 40 to 52 percent by weight of $SiO_2$, 27 to 37 percent by weight of $Al_2O_3$, 11 to 13 percent by weight of MgO, 2 to 8 percent by weight of $B_2O_3$, 2 to 8 percent by weight of CaO, and 0.1 to 3 percent by weight of $ZrO_2$.

2. A glass-ceramic composite as in claim 1, wherein said ceramic consists of one selected from the group consisting of alumina mullite and mixtures thereof.

3. A glass-ceramic composite as in claim 1 wherein, said glass-ceramic composite is applicable for integrated circuit package.

4. A glass-ceramic composite as in claim 1 wherein, said glass ceramic is applicable to multilayer substrates and allows wiring of fine pitches.

5. A glass-ceramic composite as in claim 1, wherein said alumina has purity of 99.9% or more.

6. A glass-ceramic composite as in claim 1, wherein said mullite has purity of 99.9% or more.

7. A glass-ceramic composite with large insulating property consisting essentially of non crystallized glass and a ceramic containing at least one of alumina and mullite at the ratio by weight of eighty through fifty-five to twenty through forty-five, said glass containing 40 to 52 percent by weight of $SiO_2$, 27 to 37 percent by weight of $Al_2O_3$, 11 to 13 percent by weight of MgO, 2 to 8 percent by weight of $B_2O_3$, 2 to 8 percent by weight of CaO, and 0.1 to 3 percent by weight of $ZrO_2$.

8. A glass-ceramic composite with high strength, high thermal expansion coefficient, and low permittivity consisting essentially of non crystallized glass and a ceramic containing at least one of alumina and mullite at the ratio by weight of eighty through fifty-five to twenty through forty-five, said glass containing 40 to 52 percent by weight of $SiO_2$, 27 to 37 percent by weight of $Al_2O_3$, 11 to 13 percent by weight of MgO, 2 to 8 percent by weight of $B_2O_3$, 2 to 8 percent by weight of CaO, and 0.1 to 3 percent by weight of $ZrO_2$.

9. A glass-ceramic composite with dense surface, no water absorbing capacity, and high strength consisting essentially of non crystallized glass and a ceramic containing at least one of alumina and mullite at the ratio by weight of eighty through fifty-five to twenty through forty-five, said glass containing 40 to 52 percent by weight of $SiO_2$, 27 to 37 percent by weight of $Al_2O_3$, 11 to 13 percent by weight of MgO, 2 to 8 percent by weight of $B_2O_3$, 2 to 8 percent by weight of CaO, and 0.1 to 3 percent by weight of $ZrO_2$.

10. Method for making a glass-ceramic composite consisting essentially of non-crystallized glass and a ceramic selected from the group consisting of alumina and mullite, said glass containing 40 to 52 percent by weight of $SiO_2$, 27 to 37 percent by weight of $Al_2O_3$, 11 to 13 percent by weight of MgO, 2 to 8 percent by weight of $B_2O_3$, 2 to 8 percent by weight of CaO, and 0.1 to 3 percent by weight of $ZrO_2$, said method comprising the steps of:

(a) weighing and mixing $CaCO_3$, $Al(OH)_3$, $SiO_2$, $MgCO_3$, $H_3BO_3$, and $ZrO_2$;

(b) melting the mixture of step (a) in a platinum or alumina crucible at a temperature of 1,400° C. to 1,500° C.;

(c) dropping the molten mixture of step (b) into water to form frit;

(d) crushing the frit of step (c) to glass powder;

(e) mixing said glass powder of step (d) with alumina or mullite powder at the ratio of 80 through 55 to 20 through 45;

(f) molding the mixture of step (e); and (g) firing the molded body of step (f) at temperature of 900° C. to 1,000° C.

11. Method for making a glass-ceramic composite as in claim 10, wherein said firing of said step (g) is conducted at a speed of about 1800° C./hour.

12. Method for making a glass-ceramic composite as in claim 10, wherein said glass powder of step (d) has the average grain diameter of not greater than 3 micrometer and the specific surface area of not less than 4 $m^2/g$.

13. Method for making a glass-ceramic composite as in claim 10, wherein said frit of step (c) is crushed with an alumina ball mill.

14. Method for making a glass-ceramic composite as in claim 10, wherein said alumina of step (e) has purity of 99.9% or more.

15. Method for making a glass-ceramic composite as in claim 10, wherein said mullite of step (e) has purity of 99.9% or more.

16. Method for making a glass-ceramic composite as in claim 10, wherein said mixture of step (e) is molded by the green sheet method.

17. Method for making a glass-ceramic composite as in claim 10, wherein said mixture of step (e) is press-molded.

* * * * *